S. BELANGER.
MACHINE FOR DIGGING TRENCHES.
APPLICATION FILED NOV. 15, 1911.

1,042,997.

Patented Oct. 29, 1912.
6 SHEETS—SHEET 4.

WITNESSES:

INVENTOR:

S. BELANGER.
MACHINE FOR DIGGING TRENCHES.
APPLICATION FILED NOV. 15, 1911.

1,042,997.

Patented Oct. 29, 1912.

6 SHEETS—SHEET 6.

WITNESSES:

INVENTOR:

UNITED STATES PATENT OFFICE.

SALUSTE BELANGER, OF SALEM, MASSACHUSETTS.

MACHINE FOR DIGGING TRENCHES.

1,042,997.	Specification of Letters Patent.	Patented Oct. 29, 1912.

Application filed November 15, 1911. Serial No. 660,493.

*To all whom it may concern:*

Be it known that I, SALUSTE BELANGER, a citizen of the United States, and resident of Salem, in the county of Essex and State of Massachusetts, have invented certain new and useful Improvements in Machines for Digging Trenches, of which the following is a specification.

This invention relates to machines for digging or dredging trenches.

The object of the invention is to provide a machine for digging trenches or ditches, which can be transported from place to place, which is provided with power operated means for picking or loosening the dirt, and means for conveying the loosened material from the ditch.

With the above object and other objects in view, the invention consists in the ditch dredging machine hereinafter described and particularly defined in the claims, the advantages of which will be obvious to those skilled in the art from the following description.

The invention will be readily understood from an inspection of the accompanying drawings, in which—

Figure 1:
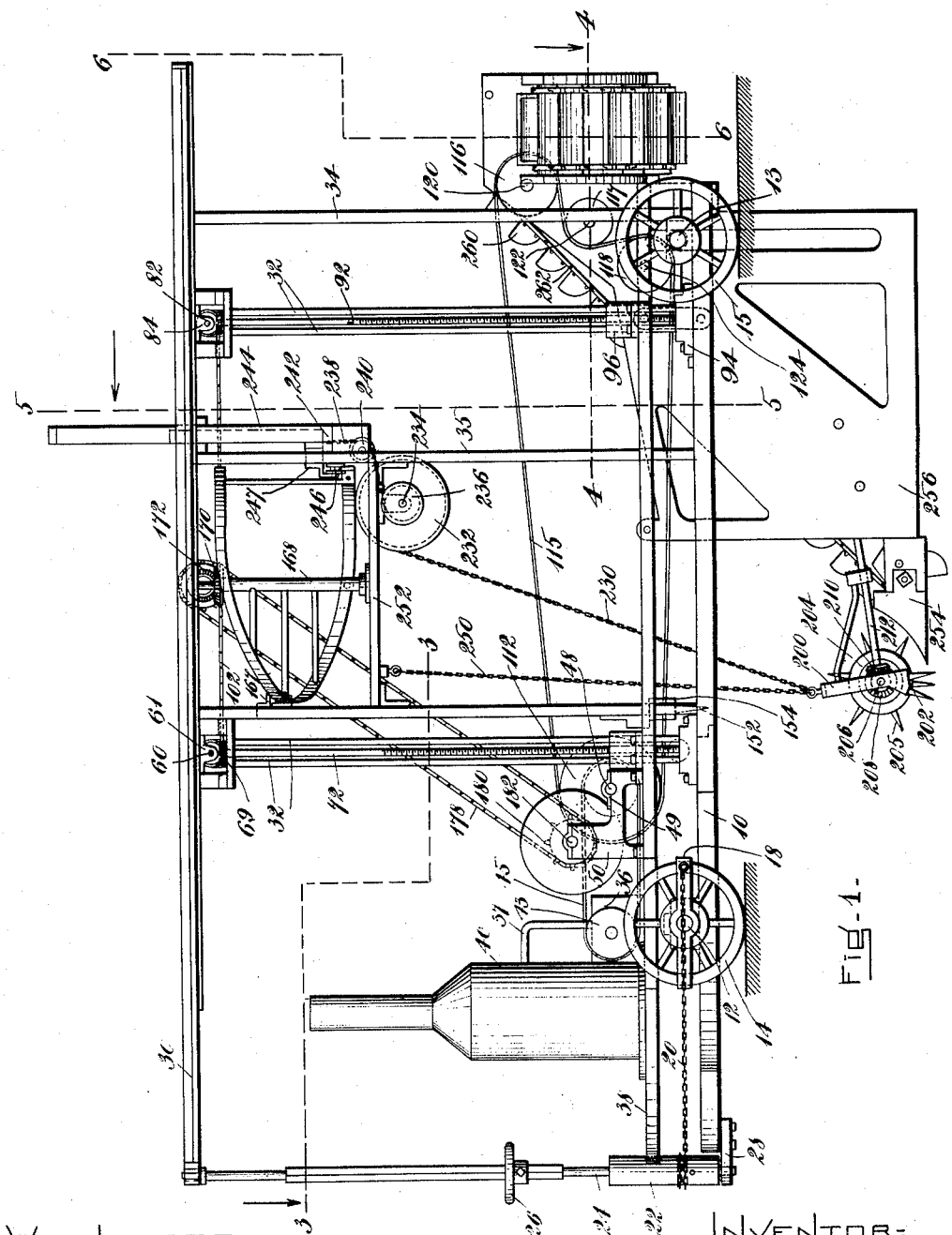
Figure 2:
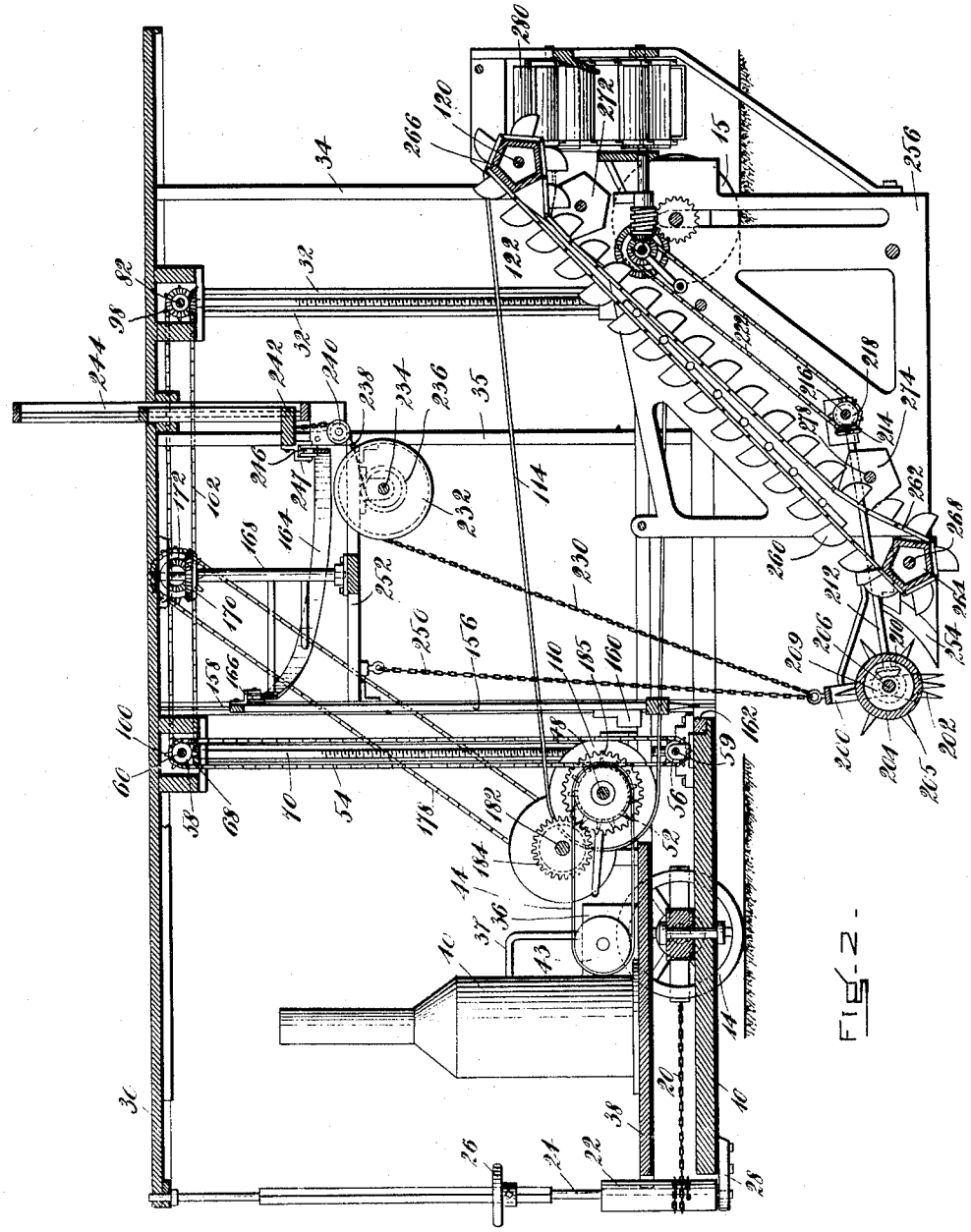
Figure 3:
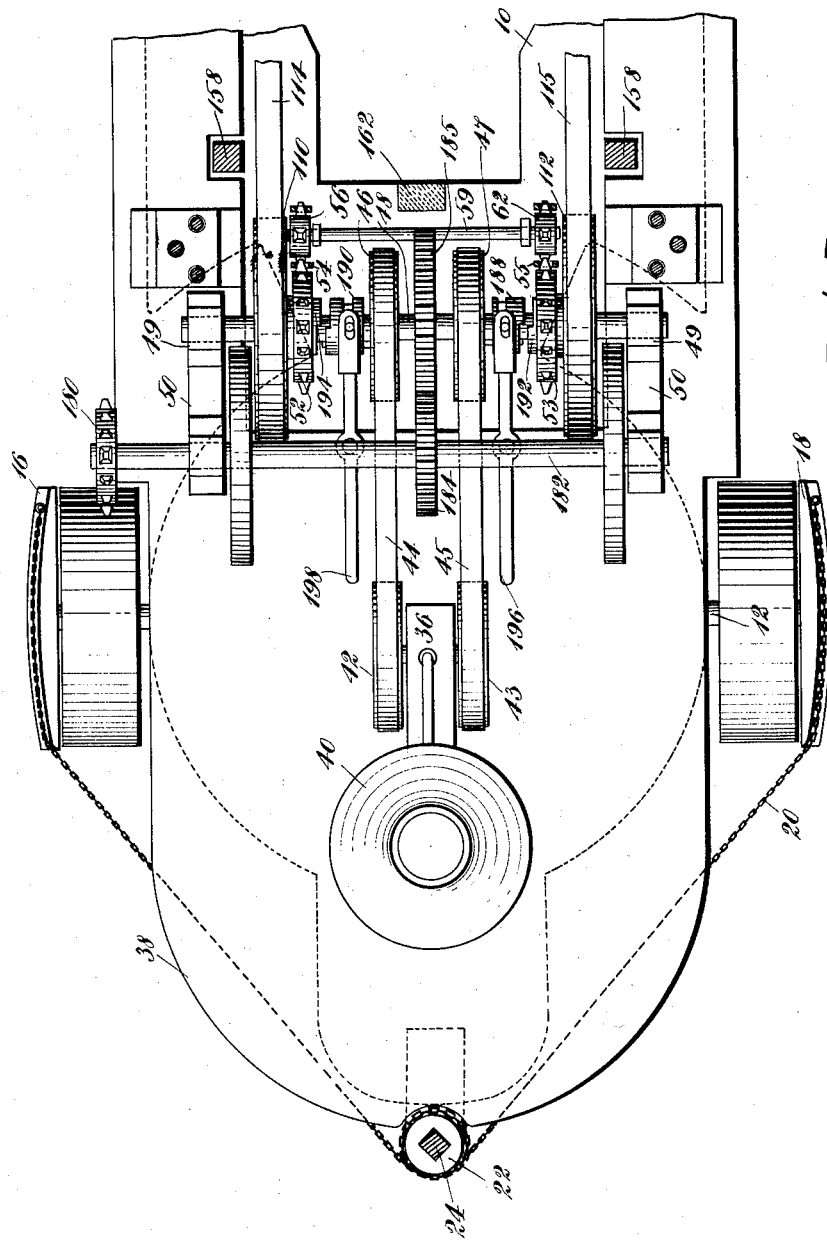
Figure 4:
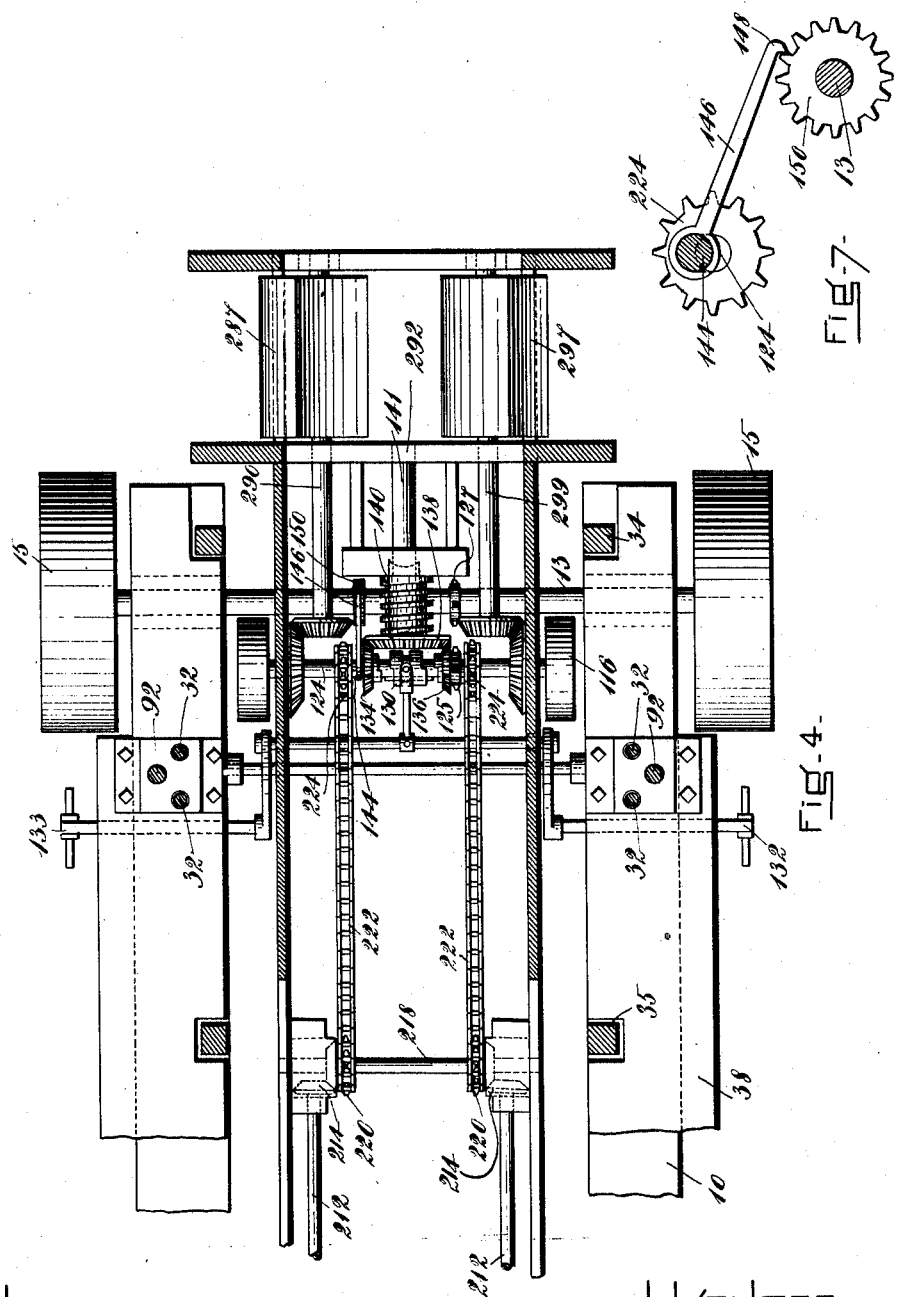
Figure 5:
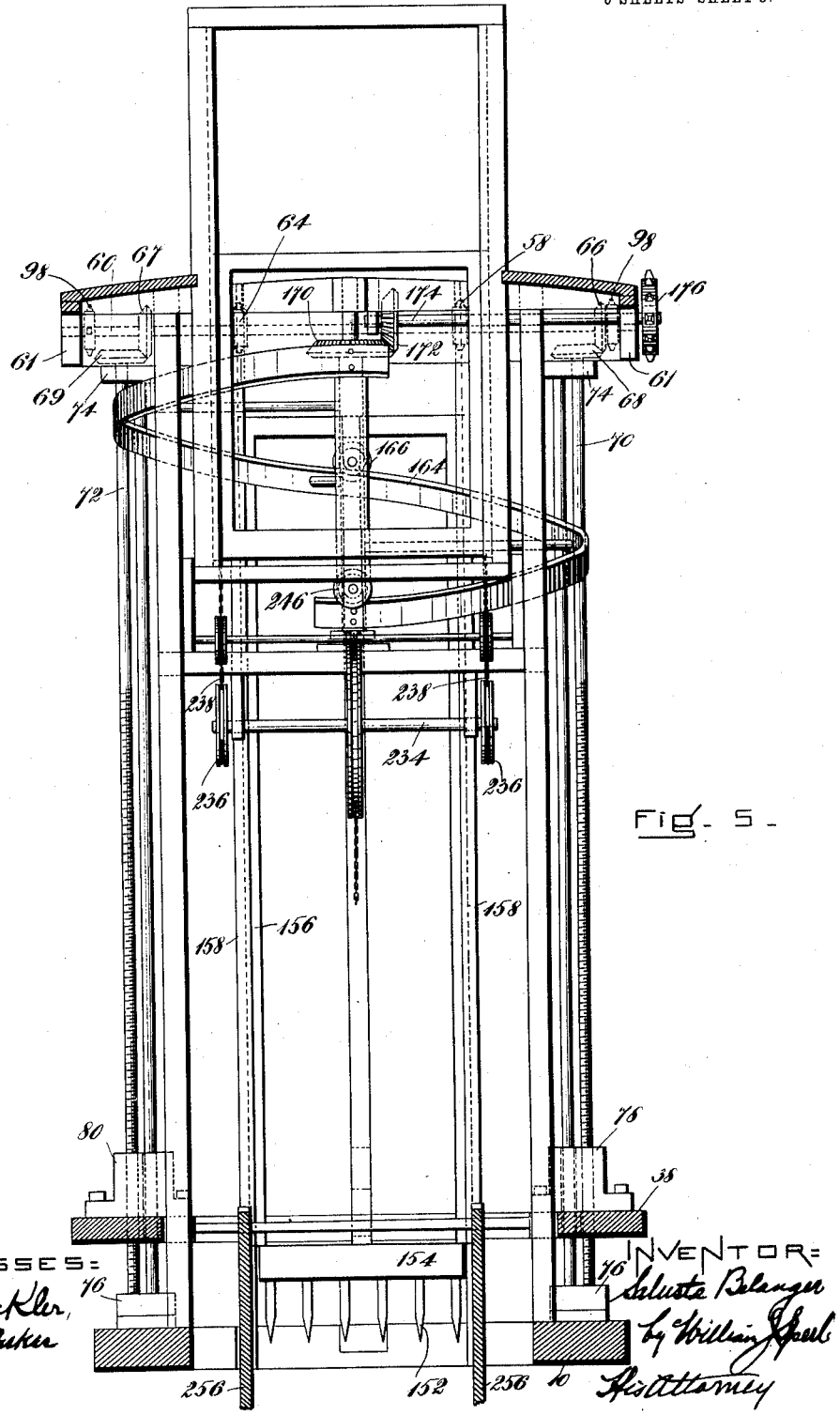
Figure 6:
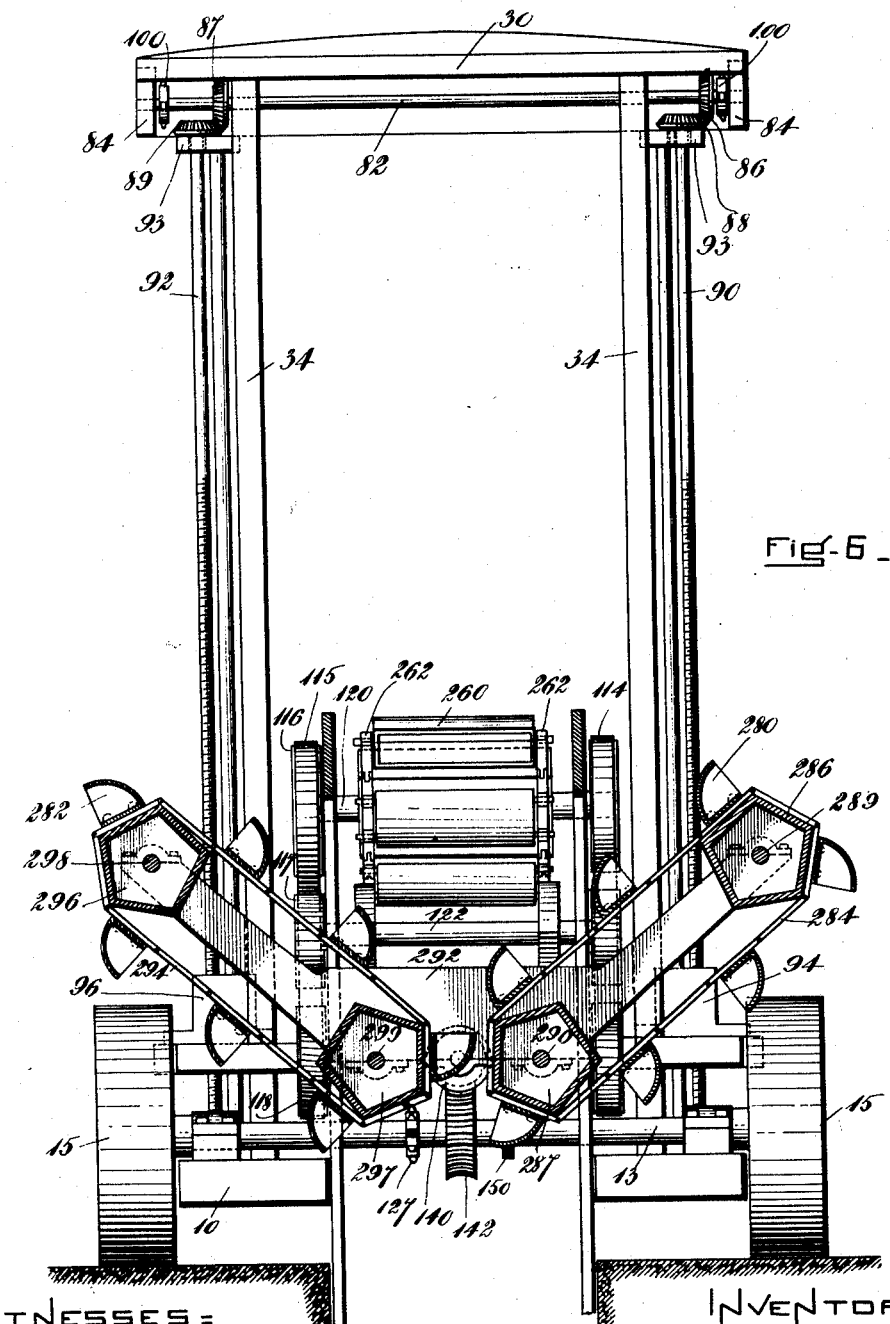

Figure 1 is a side elevation of the machine in position with the digging mechanism in the trench, Fig. 2 is a central longitudinal vertical section of the same, with parts in elevation, Fig. 3 is a horizontal section taken on the line 3—3 in Fig. 1, showing the front portion of the machine on an enlarged scale, Fig. 4 is a similar view of the rear portion taken on the line 4—4 in Fig. 1, Fig. 5 is a vertical section on an enlarged scale taken on the line 5—5 in Fig. 1, Fig. 6 is a similar view taken on the line 6—6 in Fig. 1, and Fig. 7 is a detail view of the driving mechanism employed when the digging mechanism is lowered only a portion of the depth of the ditch.

As illustrated in the drawings, the machine comprises a body 10, suspended from axles 12 and 13, provided with wheels 14 and 15, respectively. The axle 12, or front axle, is the steering axle, while the rear axle 13 is the driving axle. Secured to the ends of the steering axle are cross-arms 16 and 18 to which the ends of a chain 20 are fastened. This chain passes around a cylinder 22, mounted on a shaft 24, said shaft being squared for a portion of its length and provided with an adjustable steering hand wheel 26. The ends of the chain 20 being secured to the guides 16 and 18, and passing along their outer edges are kept from interfering with the front wheels as they are turned. The shaft 24 is journaled at its lower end in a bearing 28 on the body 10, and the upper end of said shaft is journaled in a bearing on the canopy or roof 30 of the machine. This canopy is supported by rods or posts 32 and struts 34, 35, extending upward from the body 10.

The machine is arranged to be propelled over the ground by an engine 36 carried on a platform 38, which can be raised and lowered with respect to the body 10, in order to draw the digging mechanism up out of the ditch and maintain it above the ground during the time that the machine is moving from place to place. The power plant, which is mounted at the forward end of the platform 38, consists of a boiler 40 furnishing steam through a pipe 37 to an engine 36, which is of the reversible type. The engine is provided with a pair of flywheels 42, 43, connected by belts 44, 45, respectively, with pulleys 46, 47, on a countershaft 48. The countershaft 48 is journaled in bearings 49 on frames 50 mounted on the platform 38. A pair of sprockets 52, 53 are mounted on the countershaft 48 and are adapted to engage and drive sprocket chains 54, 55, respectively. The chain 54 coöperates with a sprocket wheel 56, fastened to the shaft 59, and with a similar sprocket wheel 58 on the shaft 60, journaled in bearings 61 on the canopy 30; and the chain 55 coöperates with a sprocket wheel 62 on the shaft 59 and also with a similar sprocket 64 on the shaft 60. A pair of bevel gears 66, 67 are fast on the shaft 60 and mesh with a corresponding set of bevel gears 68 and 69, respectively, on the upper ends of screw threaded shafts 70 and 72, respectively. These screw threaded shafts are journaled at their upper ends in bearings 74, and their lower ends are journaled in bearings 76, on the body 10. The screw threaded shafts 70 and 72, pass through correspondingly threaded blocks or nuts 78 and 80, respectively, mounted on the platform 38. A shaft 82, parallel to the shaft 60, is journaled in bearings 84, mounted on the canopy 30, and is provided with bevel gears 86, 87, which mesh with gears 88, 89, respectively, on screw threaded shafts 90 and 92. The shafts 90 and 92 are journaled at their upper ends in bearings 93, and at their lower ends in bearings 94 on the body 10. The shafts 90 and 92 pass through correspondingly threaded blocks or nuts 94 and 96, respectively, mounted on the platform 38. The shafts 60 and 82 are provided with a pair of sprockets 98 and 100, respectively, connected by chains 102.

By the construction above set forth the screws 70, 72, 90 and 92, can be rotated and the platform 38 raised to draw the digging mechanism, which is attached thereto, up out of the ditch to enable the machine to be transported from place to place, or by reversing the direction of rotation of the screws the platform can be lowered to bring the digging mechanism into working position. When the platform 38 is raised or lowered the engine and countershaft move with it, the sprocket wheels 52 and 53 traveling along the vertical belts 54 and 55, respectively, and also driving them.

The machine is intended to dig a ditch of uniform depth, the digging and conveying mechanism being lowered to the desired depth.

When it is desired to move the machine from place to place, the power plant and digging mechanism are in raised position, and the following mechanism is provided for driving the rear wheels 15: A pair of driving pulleys 110, 112 are mounted on the countershaft 48, which coöperate with belts 114 and 115, respectively. These belts pass over pulleys 116, 117 and 118, mounted on shafts 120, 122 and 124, respectively. A sprocket 125, is mounted on the shaft 124, which is adapted to coöperate with a sprocket chain passing over a sprocket 127, on the rear or driving axle 13. This chain is intended to be lengthened or shortened as required according to the relative positions of the axle 13 and the shaft 124. When the digging mechanism is raised the shaft 124 is separated from the rear axle 13, so that the sprocket chain is necessary to provide a driving connection between said shaft and axle. The direction of rotation of the rear axle is controlled by a clutch 130, slidably keyed on the shaft 124 and provided with handles 132, 133, by means of which it can be moved along the shaft. This clutch is adapted to be brought into engagement with either of two bevel gears 134, 136, rotatable on the shaft 124. The bevel gears 134, and 136 mesh with a central bevel gear 138 connected to a worm 140 on a shaft 141, journaled in suitable bearings. The worm 140 meshes with a worm wheel 142 on the rear axle 13, when the digging mechanism is lowered to its full extent, as shown in Figs. 2 and 6; therefore in this position the chain above mentioned as passing over the sprockets 125, 127 is not needed. When the mechanism is in this position the machine can be fed ahead little by little as the digging operation progresses. Occasionally it may be desirable or necessary to feed the machine ahead step by step when the digging mechanism is raised to an intermediate position. In this event the shaft 124 may be formed with an eccentric portion 144 upon which a pitman 146 is mounted provided with a hooked end or pin 148 adapted to engage teeth on a wheel 150 on the axle 13. At each revolution of the shaft 124, the wheel 150 is fed a portion of a turn, and thus the machine is fed a step at a time.

In order to loosen the dirt in advance of the digging mechanism, I provide a reciprocatory pick, composed of a series of pointed spikes 152 depending from a head 154, carried by a frame 156 which is slidably mounted in vertical guides 158. The downward movement of the head 154 is limited by a stop 160 on the frame, which is adapted to come against a buffer 162 on the body 10. The frame 156 is raised by a rotating spiral 164, which engages a roller 166 carried by a bracket 167 on said frame. When the roller 166 arrives at the upper end of the spiral it becomes disengaged therefrom and the frame and head consequently fall so that the spikes 152 enter the ground. The continued rotation of the spiral causes a periodic raising and dropping of the pick. The spiral is mounted on a vertical shaft 168 journaled in suitable bearings and is provided with a bevel gear 170, which meshes with a bevel gear 172 on a shaft 174. The shaft 174 is provided with a sprocket wheel which engages a chain 178 passing over a sprocket 180 on a jack shaft 182. The jack shaft 182 is journaled in bearings on the frames 50, and is provided with a spur gear 184 which meshes with a spur gear 185 on the countershaft 48.

The countershaft 48 is thrown into and out of action by means of clutches 188 and 190 slidable on the countershaft and arranged to engage complementary members 192, 194 on said shaft. Said clutches are controlled by levers 196 and 198, respectively.

In addition to the reciprocatory pick, which is intended to loosen the dirt near the top of the trench, I provide a rotary pick which may also be periodically raised and dropped. It comprises a frame 200, having points or spikes 202 on its ends, and a cylinder 204 having a series of radiating spikes 205, said cylinder being mounted on a shaft 206 journaled in the ends of the frame 200. The shaft 206 is provided with a pair of bevel gears 208, which mesh with bevel gears 210 on shafts 212, said shafts 212 being also provided at their other ends with bevel gears 214, which mesh with bevel gears 216 on a shaft 218. The shaft 218 is provided with a pair of sprocket wheels 220, which coöperate with sprocket chains 222 engaged by sprockets 224 on the shaft 124. By means of the mechanism described the pick is rotated from the shaft 124.

To raise the pick, a chain 230 is attached at one end to the frame 200, and at its other end to a winding drum 232, mounted on a shaft 234. A pair of pulleys 236 are mounted on the shaft 234, to which pulleys chains 238 are attached, which pass over idlers 240 and are attached at their upper ends to a sliding frame 242. The frame 242 is mounted to slide in guides 244, and is also provided with a roller 246 mounted in a bracket 247 and rolling on the top of the spiral 164. The spiral being rotated, the frame 242 is raised and with it the frame 200, until the roller passes off from the upper end of said spiral, whereupon the frames drop, and the spikes 202 enter and loosen the earth. The downward movement of this pick is limited by a chain 250, which is attached at its lower end to the frame 200, and at its upper end to a stationary platform 252.

Just at the rear of the rotary pick are a pair of cutters 254, shaped like plowshares and mounted at the front end of frames 256. These frames are attached to the platform 38 and move therewith, and it is upon these frames that the digging and conveying mechanism about to be described is mounted. The cutters 254 are arranged to make a finishing cut of the sides of the trench to insure an even width throughout.

The mechanism for digging up and conveying the dirt comprises an inclined train of buckets 260 pivotally mounted on a chain 262. These chains pass over pentagonal pulleys 264, 266, mounted on shafts 268 and 120, journaled in the frames 256. The buckets are guided on their return movement by similar pulleys 272, 274, mounted on shafts 122 and 278, to prevent said buckets from interfering with the driving mechanism for the picks.

The buckets on the above inclined carrier are arranged to discharge into two transversely extending inclined carriers. These carriers are provided with buckets 280, 282, which alternate. The buckets 280 are carried by chains 284 passing over pentagonal pulleys 286, 287 mounted on shafts 289 and 290, respectively, journaled in bearings on the transverse frame 292. The buckets 282 are carried by chains 294 passing over pentagonal pulleys 296, 297, mounted on shafts 298, 299, also journaled in bearings in the transverse frame 292.

With the mechanism above described the dirt is conveyed by the buckets 260 and dumped alternately into buckets 280 and 282, and by them discharged on opposite sides of the trench.

While I have illustrated and described a preferred embodiment of the invention, I am aware that many modifications can be made therein by any person skilled in the art without departing from the scope of the invention as expressed in the claims. Therefore, I do not wish to be limited to all of the details of construction shown and described, but

What I claim is:—

1. A trench digging machine, having in combination, a slidably mounted frame provided with a series of spikes at its lower end, a pivotally supported frame having spikes depending therefrom, and means for intermittently raising said frames.

2. A trench digging machine, comprising a shaft, a pair of bevel gears on said shaft, a frame, a shaft journaled in said frame and provided with a pair of bevel gears, a spiked cylinder mounted on said last mentioned shaft, a pair of shafts each provided with a bevel gear on each end thereof meshing with one of the gears of the two previously mentioned shafts, and means for intermittently raising and lowering said cylinder.

3. A trench digging machine, comprising a driving shaft, a pair of oppositely inclined conveyers driven from said shaft, a rotary pick, a pair of shafts connected to rotate the pick, connections between said pair of shafts and said driving shaft, and a conveyer arranged to convey the material loosened by said pick and deliver said material to said inclined conveyers.

4. A trench digging machine, comprising a slidably mounted pick, a pivotally supported pick, a spiral, and means for rotating said spiral to raise said picks, said picks being arranged to fall by gravity when freed from said spiral.

5. A trench digging machine, comprising a slidably mounted pick, a frame provided with spikes, a rotary pick carried by said frame, and means for raising said picks.

6. A trench digging machine, comprising a slidably mounted pick, a frame provided with spikes, a rotary pick carried by said frame, means for raising said picks, said picks being arranged to drop when released from said raising means, and means for conveying away the material loosened by said picks.

In testimony whereof I have affixed my signature, in presence of two witnesses.

SALUSTE BELANGER.

Witnesses:
WILFRID J. BELANGER,
WILLIAM J. SPERL.